INVENTOR.
Waldemar T. Rentschler
BY
Arthur A. March
ATTORNEY

July 19, 1966  W. T. RENTSCHLER  3,261,275
PHOTOGRAPHIC SHUTTER HAVING TWO ESCAPEMENT MECHANISMS
Filed March 9, 1964  2 Sheets-Sheet 2

INVENTOR.
Waldemar T. Rentschler
BY
Arthur A. March
ATTORNEY

3,261,275
PHOTOGRAPHIC SHUTTER HAVING TWO ESCAPEMENT MECHANISMS

Waldemar T. Rentschler, Calmbach (Enz), Germany, assignor to Alfred Gauthier G.m.b.H., Calmbach (Enz), Germany, a corporation of Germany
Filed Mar. 9, 1964, Ser. No. 350,472
Claims priority, application Germany, Mar. 16, 1963, G 37,294
11 Claims. (Cl. 95—63)

The present invention relates to a photographic shutter having, in addition to the conventional escapement mechanism for relatively short duration exposures, a second escapement mechanism for obtaining relatively long duration exposures.

It is one of the principal objects of this invention to provide an escapement mechanism for obtaining relatively long exposure times with a simple, dependable structure capable of operation with shutters of known design without appreciable change of the basic shutter structure.

The present invention includes a separate spring drive which can be manually cocked and set at a predetermined exposure time value in which the spring will be prestressed to a controlled amount. In addition the invention includes a locking device controlled by the shutter blade driving mechanism to retain the spring drive in cocked position, the locking device being arranged to release the spring drive for operation immediately after release of the shutter itself. An additional locking device is provided to block the shutter blade driving mechanism in the position corresponding to the open position of the shutter blades, the additional locking device being released at the end of the operation, or running down, of the long duration exposure escapement mechanism. This release is effected by an actuating device associated with the escapement mechanism. The foregoing combination of elements provides a photographic intralens shutter having an escapement mechanism for relatively short duration exposure and a second escapement mechanism for relatively long duration exposures, the latter being arranged so that no demands what-so-ever are made on the basic structure of the shutter and, in particular, no demands are made on the structure of the shutter drive mechanism. This result is obtained by providing the long duration exposure escapement mechanism with a spring drive of its own which makes it possible to achieve mutual control of the shutter drive mechanism and the long duration exposure escapement mechanism entirely by means of two simple locking devices, one of which is associated with a shutter blade driving mechanism and is arranged to retain the spring drive of the long duration exposure escapement mechanism in cocked position, while the other locking device locks the operation, or running down, of the shutter blade driving mechanism in the position corresponding to the open position of the shutter blades and can be released by the long duration exposure escapement mechanism at the end of the operation of the latter.

The spring drive may comprise, in accordance with the present invention, a cocking shaft which cooperates with a spiral spring and which is provided with a cocking and setting knob and is operatively connected to the gear members of the long duration exposure escapement mechanism, either directly or by way of an intermediate gear.

It has been found that a simple, compact structure of great flexibility and freedom of choice of operation may be obtained by making the locking device for the spring drive in the form of a projection extending from the driving ring that drives the shutter blades. This projection may be a pin which, in the inoperative position of the shutter driving members, engages a gear member of the long duration exposure escapement mechanism, which member may be the escapement anchor.

The invention further provides that the locking device for locking the shutter blade driving mechanism may be in the form of an arresting lever fixedly as well as rotatably positioned on a gear plate of the long duration exposure escapement mechanism so that one end of the arresting lever is moved into the path of motion of the main drive member of the shutter when the spring drive device is cocked, while the other end of the arresting lever cooperates with the actuating device that becomes operative at the end of the running down motion of the spring drive.

The structure may also be simplified by providing the actuating device in the form of a control cam rotatably mounted and connected to the long duration exposure escapement mechanism to be driven thereby and rigidly attached to the cocking shaft of the spring drive so that the cam can be moved into a setting position dependent on the desired exposure duration by increasing the stress in the spring of the spring drive, whereby the cam will act on the arresting lever blocking the shutter blade driving mechanism in its open position at the end of the operation, or running-down motion. It is further proposed that the spring drive of the long duration exposure escapement mechanism be housed in a special housing affixed to the regular shutter housing.

In order to set the spring drive quickly and accurately a scale may be provided on or adjacent to the cocking and setting knob, this scale to be set with respect to an indicating mark. A friction coupling may be provided to connect the spring drive to the gear members of the long duration exposure escapement mechanism in order to create the necessary conditions to permit a subsequent change of the long duration exposure time setting of the spring drive after the actual cocking process.

It has been found to be of advantage to articulately connect, on the main drive member of the shutter, a lever that cooperates with the short duration exposure time escapement mechanism. This makes it possible to keep the kinetic energy, which is inherent in the driving lever and is released during the exposure run down of the shutter, away from the arresting lever of the long duration exposure escapement mechanism. This kinetic energy is manifested in the shock or impact effect proceeding from the driving lever, and in restraining this kinetic energy, the arresting lever becomes, in effect, a hard stop in the arresting, or locking, position. This is due to the fact that the lever, which is articulately connected to the driving lever and which cooperates with the escapement mechanism for short duration exposure times, impinges, with its free end, first on the braking lever of the short duration exposure time escapement mechanism to rotate this braking lever about its axis, and simultaneously draws through the gear of the escapement mechanism during the running down of the exposure until the lever is removed again from engagement with the braking lever. Coincidentally therewith, or from a kinematic view point, the driving lever comes into engagement with the arresting lever of the long duration exposure escapement mechanism. This sequence of events produces the result that the short duration exposure escapement mechanism is pulled through at a moment when the running down motion of the long duration exposure escapement mechanism has already started. As a result the end effect is that the pulling through of the short duration exposure escapement mechanism has no influence on the running or operating time of the long duration exposure escapement mechanism.

The invention will be described in greater detail in the following specification with reference to the accompanying drawings in which.

Figures 1, 2, 2A:
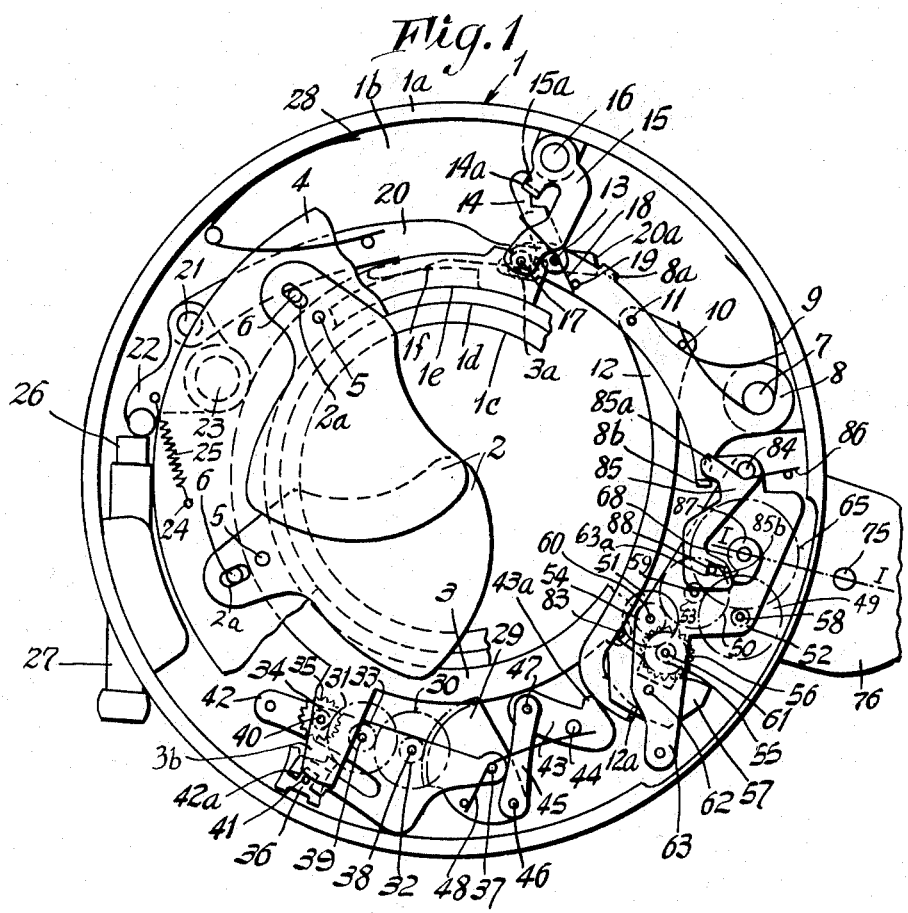
FIG. 1 shows a self-cocking shutter with built-in, long duration exposure escapement mechanism as it would appear with the front plate removed, the shutter being in its inoperative position and the spring drive of the long duration exposure escapement mechanism not cocked.
FIG. 2 shows a cross-sectional view through the spring drive of the long duration exposure escapement mechanism taken along the line I—I shown in FIG. 1.
FIG. 2a shows a partial view of the housing for receiving the spring drive, especially the part which includes the cocking and setting knob and the setting scale and pointer associated therewith.
Figure 3:
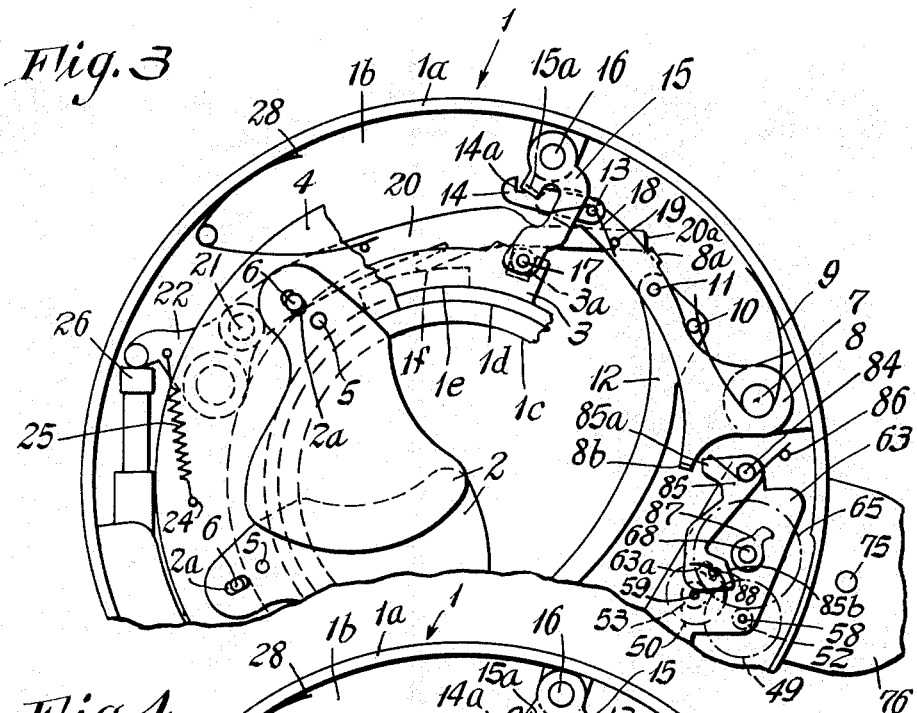
Figure 4:
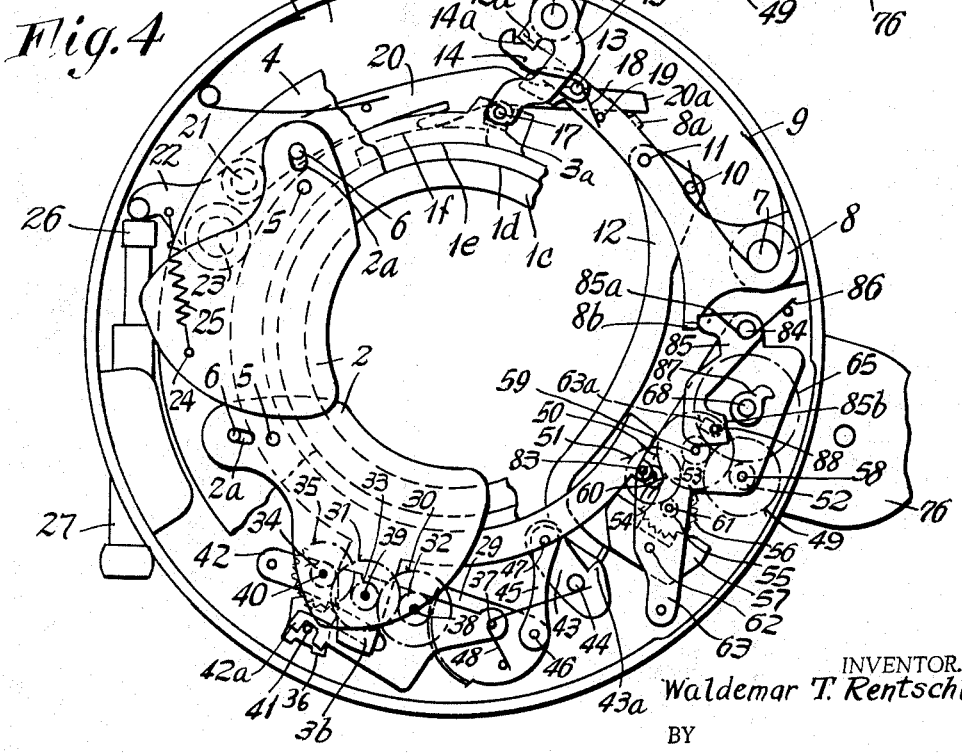

FIG. 3 is a partial view of the shutter of FIG. 1 in which the spring drive has already been moved into cocked position and the driving lever of the shutter has been moved, under simultaneous cocking of the main drive spring acting thereon, into a position which it occupies immediately prior to the subsequent, automatically adjusting release while the shutter blades are still in closed position; and FIG. 4 shows the driving lever of the shutter after release and in the intermediate position locked by the arresting lever of the long duration exposure escapement mechanism with the spring drive of the long duration exposure escapement mechanism being released for operation and the shutter blades being completely open.

Referring first to FIG. 1 it will be seen that the photographic self-cocking shutter of the present invention is constructed in a housing 1 which has a cylindrical side wall 1a and a bottom wall 1b. A tubular socket 1c located at the center of the bottom wall provides support for a lens assembly of any suitable construction. Two concentric shoulders 1d and 1e are located on the socket 1c to provide support and guidance means for two rings 3 and 4 which operate a plurality of shutter blades 2. The shutter blades are pivotally mounted on a plurality of pins 5 on the ring 3 and have slots 2a that engage pins 6 on the ring 4 so that relative rotation of the ring 3 with respect to the ring 4 in one direction causes the shutter blades to swing open and relative rotation in the opposite direction causes them to swing closed again. The ring 4 in particular may be operated by a known device, which therefore is not shown in the drawing, to provide an additional opening of the shutter. When the additional device is actuated the ring 4 rotates clockwise so as to open the shutter blades 2 and subsequently rotates counterclockwise under the force of a spring, thus closing the shutter blades again.

A pivot pin 7 is affixed to the bottom wall 1b and a driving member in the form of a two-armed lever 8 is pivotally mounted on the pin and serves to operate the shutter blades 2 in a manner to be described hereinafter. A spring 9 resiliently biases the member 8 by virtue of the fact that one end of the spring bears against the side wall 1a of the housing while the other end presses against a pin 10 which is mounted on a lever 12 articulately connected to the member 8 by means of a pivot pin 11.

The driving member 8 has a pivot pin 13 at one end on which a sliding pawl 14 is mounted. The purpose of this pawl is to transfer the kinetic forces of the member 8 to the ring 3 to open the shutter blades 2 and then to reverse the motion of this ring so as to close the shutter blades again. To facilitate this operation the free end of the pawl has conventional coupling jaws 14a which engage a lug 15a extending from an intermediate lever 15 pivotally mounted on a pin 16 which is attached to the bottom wall 1b of the housing. The lever 15 also has a pin 17 at one end of the lever to engage a slot 3a in the driving ring 3. A relatively light spring 18 is hooked over the pawl 14 and over a pin 19 on the member 8 to provide pressure to keep the pawl 14 in contact with the lug 15a during the operation of the shutter when making an exposure.

The driving spring 9 is cocked by means of a pawl 20 that cooperates with the driving member 8 and is articulately connected by means of a pivot pin 21 to a reversing lever 22. The latter is pivotally mounted on a pin 23 extending from the bottom wall 1b and is resiliently biased by a spring 25 which extends between the lever 22 and a fixed pin 24 and urges the lever against a pusher 26 slidably mounted in a tubular member 27 which extends through the side wall 1a of the shutter housing and serves as a socket for connecting a cable release.

The pawl 20 which may be referred to as an impact, or a butting, pawl is articulately connected to the reversing lever 22 and is resiliently biased by a spring 28 so that it presses against a concentric shoulder 1f of the tubular socket 1c. The spring keeps the pawl 20 in engagement with the socket even when the release pusher 26 is actuated. The free end 20a of the impact pawl 20 engages a lug 8a of the driving member 8 so as to produce a clockwise rotary motion of the driving member 8 while cocking the driving spring 9. Referring momentarily to FIG. 3 it will be seen that, when the members 8 and 20 have reached the positions illustrated therein, the end 20a is separated from the lug 8a. As a result the driving member 8 returns to its starting position because of the force of the driving spring 9, and in returning, it causes the pawl 14 and the intermediate lever 15 to impart a reciprocating motion to the driving ring 3 so as to open and close the shutter blades 2.

The lever 12 actuates a gear escapement mechanism which is known per se and which is arranged in the shutter housing 1 so as to delay to a controlled extent the speed of operation, or the running down, of the driving member 8, thereby controlling the duration of the exposure by controlling the length of time that the shutter blades remain in the open position. The escapement mechanism shown in the present embodiment comprises, as may be seen in FIG. 1, a gear segment 29 which drives a gear train composed of gears 30 and 31 and of pinions 32, 33, and 34. An escapement, or ratchet, gear 35 is controlled by an escapement anchor 36 and is mounted on the pinion 34. The parts 29 to 36 are mounted on axle pins 37 to 41 held by two gear plates of which only the upper plate 42 is visible. In order to facilitate the setting of the shutter speed, the escapement anchor 36 is removed from engagement with the escapement gear 35 when the shutter is in its inoperative position. This is accomplished by means of a radially extending arm 3b on the driving ring 3. When the shutter is in its rest, or inoperative, position, the arm 3b lifts the axle 41 of the escapement anchor 36, which is held in a forked guide 42a of the upper plate 42, against the pressure of a light spring (not shown in the drawing) so as to remove the escapement anchor 36 from engagement with the escapement gear 35.

The gear segment 29 is connected to a braking lever 43 pivotally mounted on a pin 44 on the bottom wall 1b. A connecting rod 45 serves as the linkage between the segment 29 and the braking lever 43, one end of the rod 45 being articulately connected to the segment 29 by means of a pin 46 and the other end being connected to the lever 43 by means of a pin 47. A spring 48 resiliently biases the gear segment 29 to urge the escapement mechanism and the braking lever 43 into starting positions corresponding to the longest controlled exposure time. A setting member (not shown for reasons of clarity) has a cam that cooperates with the gear segment 29 or with the braking lever 43 to set the escapement mechanism at the desired exposure time. This setting operation causes a nose 43a, which extends from the braking lever 43, to assume a specific relative position with respect to a lug 12a on the lever 12, this specific position being dependent upon the exposure time set. The result is that, as the driving member 8 goes through its operating motion to actuate the shutter blades 2, the lug 12a remains in contact with the nose 43a over a distance which may be greater or shorter depending upon the duration of the exposure. This engagement between the lug 12a and the stud 43a takes place when the shutter blades 2 have reached their open position.

The foregoing gear escapement mechanism comprising elements 29 through 48 may be designed to operate over an exposure time range from approximately 1 second to approximately 1/500 second. A second gear escapement mechanism is arranged within the shutter housing 1 for automatically controlling the shutter during much longer exposures.

The second escapement mechanism comprises gears 49, 50, and 51 along with pinions 52 through 55, an escapement, or a ratchet gear 56, and an escapement anchor 57. The escapement members 49 through 57 are mounted on axles 58 through 62 which are held in place by two gear plates 63 and 64 affixed to the bottom wall 1b of the shutter housing, as is shown in FIG. 2. Also shown in FIG. 2 is a driving gear 65 which is rigidly attached to a hollow shaft 66 and which meshes with the pinion 52. The shaft 66 rotates within a bushing 67 affixed to the bottom wall 1b and is adapted to receive another shaft 68, one end of which is squared off as indicated by reference numeral 68a, to receive a gear 69. A friction coupling designed to drive the gear 65 is located between the shafts 66 and 68. In the present embodiment this friction coupling includes a driving plate 70 attached to the shaft 66 and a prestressed spring disc 71 between the plate 70 and the gear 69 and mounted on the squared section 68a. Another gear 72 rigidly attached to a hollow shaft 73 meshes with the gear 69. This hollow shaft 73 will be referred to hereinafter as the cocking shaft and is rotatably mounted on a pin 75 supported by a carrier plate 76 which, in turn, is attached at the rear of the bottom wall 1b. The members 69 through 73 are outside of the shutter housing 1 and are covered by a cap 77, which may be secured to the carrier plate 76 by means of screws (not shown).

The escapement mechanism including the elements 49 through 67 for providing long duration exposures is driven by a spiral spring 78, one end of which is attached to the shaft 73 and the other end of which is attached to a cocking and setting knob 79. This knob has a hollow space 79a, within which the spring 78 is contained, and is rotatably mounted on the shaft 73 to which it is secured by a small screw plate 80 attached to the pin 75. The desired exposure duration may be set by rotating the knob 79 to place a particular number of a scale 81 opposite a fixed mark 82.

In order to make it possible to hold the long duration exposure mechanism including elements 49 through 67 in cocked position, the present invention provides a locking device which is controlled by the mechanism that drives the shutter blades. This locking device releases the spring drive including elements 68 through 80 for operation immediately after the release trigger for the shutter has been actuated. In the present embodiment this locking device includes a pin 83 on the shutter blade driving ring 3. When the shutter driving members are in inoperative position, the pin 83 engages the escapement anchor 57 and prevents it from swinging out, thus keeping the escapement mechanism from operating.

After the mechanism for driving the shutter blades has been released and after the long duration escapement mechanism including elements 49 through 67 has also been released, the mechanism that drives the shutter blades can be blocked in a position corresponding to the open position of the shutter blades 2 by means of a locking device that is released by the long duration escapement mechanism. This is accomplished, in the present embodiment, by means of an arresting lever 85 which is pivotally mounted on a pin 84 on the gear plate 63 and which is urged in the counterclockwise direction by a spring 86. As a result, when the spring drive including elements 68 through 80 is cocked, the arresting lever 85 occupies a position that places its end 85a in the path of the lug 8b when the driving lever 8, upon being released for running down, reaches the position associated with the open position of the shutter blades 2. At that point the arresting lever 85 prevents the lever 8 from rotating any farther.

The driving lever 8 is released for further rotary motion by an actuating device controlled by the spring drive elements 68 through 80. This actuating device includes a control cam 87 which is rigidly attached to the shaft 68 and which strikes the end 85b of the arresting lever at the end of the operation of the spring drive immediately prior to the instant that the latter reaches its starting position. This causes a clockwise rotation of the arresting lever 85 which removes the latter from engagement with the lug 8b. This in turn releases the driving lever 8, permitting it to return to its inoperative position under the force of the spring 9 and thereby carrying the shutter blades 2 back into their closed position by means of the ring 3. A pin 88 on the arresting lever 85 engages an opening 63a of the gear plate 63 and limits the range of motion of the lever 85 to the extent required for blocking and releasing the driving lever 8.

The method of operation of the shutter is as follows:

If a photograph is to be made using the long duration exposure mechanism, the spring drive elements 68 through 80 must first be cocked by stressing the spiral spring 78 by means of the knob 79. During this process the gear members of the long duration escapement mechanism remain stationary since the pin 83 of the shutter blade driving ring 3 engages the escapement anchor 57 and locks the escapement gear 56, while the spring disc 71 slides on the driving plate 70. The cocking process continues until the desired numerical value of the scale 81 is opposite the fixed mark 82.

All that the photographer needs to do to release the shutter is to operate the cable release which causes the pusher 26 to be moved within the release tube 27. This rotates the driving lever 8 clockwise about the pin 7 due to the impact pawl 20 which is articulately connected to the reversing lever 22 and which causes the driving spring 9 to be cocked. The sliding pawl 14 also takes part in this motion of the driving lever 8, but it does so without moving the intermediate lever 15 out of its starting position. This is due to the fact that the sliding pawl 14 slides inoperatively along the underside of the lug 15a during the first part of the motion of the driving lever 8 and only engages the lug 15a by means of the jaws 14a at the end of the cocking motion and because of the influence of the spring 18. During the cocking motion of the driving lever 8, the lever 12 that cooperates with the braking lever 43 of the short duration escapement mechanism moves so that its lug 12a slides along the nose 43a, which causes the pin 10 that engages the driving spring 9 to be lifted off of the driving lever 8. After the lug 12a has moved beyond the nose 43a, the pin 10 again engages the driving lever 8.

During the cocking motion, a relative rotary motion is imparted to the impact pawl 20 because it rests on the shoulder 1f of the tubular socket 1c. As illustrated in FIG. 3 this relative rotary motion causes the release of the driving lever 8. Due to the pressure of the spring 9 the driving lever 8 passes into its second phase of motion and rotates counterclockwise about the pin 7. This causes the intermediate lever 15 to rotate clockwise because of the sliding pawl 14. Because of the connection between the lever 15 and the ring 3, the shutter blades 2 are rotated to their open position as illustrated in FIG. 4. As the shutter blades 2 reach their open position, the lug 12a strikes the nose 43a and pivots the lever 43 clockwise while simultaneously driving the gear escapement mechanism including elements 29 through 48 until, finally, after the lever 12 has travelled a distance determined by the presetting of the escapement mechanism, it again slides off of the nose 43a as shown in FIG. 4.

The end 85b of the arresting lever reaches the locking position during the cocking of the spring drive elements 68 through 80 as a result of the force of the spring 86, illustrated in FIG. 3 and 4, and after the gear escapement mechanism 29 through 48 has been pulled through, that is, after the lug 12a has slid off of the nose 43a, the lug 8b impinges on the end 85a in the position corresponding to the open position of the shutter blades 2. This causes the driving lever 8 and the entire mechanism for driving the shutter blades to be blocked against further operation.

At the start of the opening of the shutter blades 2, rotation of the driving ring 3 causes the pin 83 to move away from the escapement anchor 57 of the long duration escapement mechanism elements 49 through 67, thereby releasing the spring drive elements 68 through 80 for operation. At the same time the arm 3b releases the pivot pin 41 of the escapement anchor 36, which permits the anchor to move into its operative position with respect to the escapement gear 35 by virtue of the pressure of a light spring.

By virtue of the time preset by means of the knob 79, the cam 87 impinges on the end 85b of the arresting lever 85 at the end of the running down motion of the spring drive and rotates the lever 85 about its axle 84 thereby removing the end 85a from engagement with the lug 8b. As a result the driving lever 8 continues its pivoting motion under the pressure of the spring 9 and finally returns to the inoperative position illustrated in FIG. 1. The motion of the driving lever 8 causes the sliding pawl 14 to rotate the intermediate lever 15 counterclockwise, thereby returning the shutter blades 2 from the open position to the closed position.

As may be seen, the shutter constructed according to the present invention operates so that the driving lever first actuates the short duration escapement mechanism elements 29 through 48 until contact is established with the arresting lever 85. One advantage of this is that the driving lever 8 is intercepted by the braking lever 43 while running down at a comparatively high speed, which means that impact or shock effects are kept away from the arresting lever 85 of the long duration escapement mechanism elements 49 through 67, thereby increasing the light and trouble-free operation of the long duration escapement mechanism. At the same time by the foregoing operating sequence is attained, that the delay of the running down of the shutter caused by the short duration escapement mechanism occurs within the operating time of the long duration escapement mechanism, which makes it unnecessary to consider the delay when the escapement mechanism elements 29 through 48 are being set.

What is claimed is:

1. A photographic shutter comprising: shutter blades; a driving mechanism connected to said blades to operate them between an open position and a closed position; a short duration exposure escapement mechanism connected to said driving mechanism to control the same; and a long duration exposure escapement mechanism comprising a spring drive and means for manually cocking said spring drive to a predetermined long duration exposure time, a first locking device connected to said driving mechanism to be controlled thereby and connected to said spring drive to retain said spring drive in cocked position and to release said spring drive for operation immediately after said driving mechanism has been released, an additional locking device connected to block said driving mechanism in its position corresponding to the open position of said shutter blades, and an actuating device to release said additional locking device at the end of the operation of said long duration exposure escapement mechanism.

2. A photographic shutter mechanism comprising: shutter blades; a driving mechanism connected thereto to drive said blades between an open and a closed position; a short duration exposure escapement mechanism connected to said driving mechanism to control the operation thereof; and a long duration exposure escapement mechanism having a spring drive, comprising a cocking shaft, a setting knob, a spring connected to said setting knob to be set by rotation thereof to a predetermined long duration exposure time, gear members in said long duration exposure escapement mechanism, a connection between said cocking shaft and said gear members, a first locking device connected to said driving mechanism to be controlled thereby and retaining said spring drive in cocked position and releasing said spring drive for operation immediately after the release of said shutter, an additional locking device to block said driving mechanism in position corresponding to the open position of said shutter blades, and an actuating device to release said locking device at the end of the running down motion of said long duration exposure escape mechanism.

3. The photographic shutter of claim 2 in which said connection from said cocking shaft to said gear members is a direct connection.

4. The photographic shutter of claim 2 in which said connection from said cocking shaft to said gears comprises an intermediate gear.

5. The photographic shutter of claim 2 in which the driving mechanism comprises a driving ring, and said first locking device comprises a pin attached to said ring and located in engagement with a member of said long duration exposure escapement mechanism when said shutter driving mechanism is in its inoperative position.

6. A photographic shutter comprising: shutter blades; a driving mechanism connected to said blades to operate them between an open position and a closed position, said driving mechanism comprising a main driving member; a short duration exposure escapement mechanism connected to said driving mechanism to control the same; and a long duration exposure escapement mechanism comprising a spring drive and means including a cocking shaft for manually cocking said spring drive to a predetermined long duration exposure time, a first locking device connected to said driving mechanism to be controlled thereby and connected to said spring drive to retain said spring drive in cocked position and to release said spring drive for operation immediately after said driving mechanism has been released, a gear plate, a lever mounted on said gear plate, one end of said lever is arranged in the path of motion of said main driving member when said spring drive is in cocked position to block said driving mechanism in its position corresponding to the open position of said shuter blades, and an actuating device cooperating with the other end of said lever to release said lever at the end of the operation of said long duration exposure escapement mechanism.

7. A photographic shutter comprising: shutter blades; a driving mechanism connected to said blades to operate them between an open position and a closed position; a short duration exposure escapement mechanism connected to said driving mechanism to control the same; and a long duration exposure escapement mechanism comprising a spring drive, a cocking shaft for cocking said spring drive to a predetermined long duration exposure time, a first locking device connected to said driving mechanism to be controlled thereby and connected to said spring drive to retain said spring drive in cocked position and to release said spring drive for operation immediately after said driving mechanism has been released, a second locking device connected to block said driving mechanism in its position corresponding to the open position of said shutter blades, and an actuating device comprising a control cam rotatably drivingly connected to said long duration exposure escapement mechanism and rigidly attached to said cocking shaft, whereby said cam can be moved during the cocking of said spring drive, said control cam engaging said second locking device to release said second locking device at the end of the operation of said long duration exposure escapement mechanism.

8. A photographic shutter comprising: shutter blades; a driving mechanism connected to said blades to operate them between an open position and a closed position; a short duration exposure escapement mechanism connected to said driving mechanism to control the same; a shutter housing for said shuter blades, said driving mechanism, and said short duration exposure escapement mechanism; and a long duration exposure escapement mechanism comprising a spring drive and means for manually cocking said spring drive to a predetermined long duration exposure time, a first locking device connected to said driving mechanism to be controlled thereby and connected to said spring drive to retain said spring drive in a cocked position and to release said spring drive for operation immediately after said driving mechanism has been released, an additional locking device connected to block said driving mechanism in its position corresponding to the open position of said shutter blades, an actuating device to release said additional locking device at the end of the operation of said long duration exposure escapement mechanism, and a separate housing containing said spring drive and attached to said shutter housing.

9. A photographic shutter according to claim 8 in which said means for manually cocking said spring drive comprises a knob connected to said spring drive, said shutter comprising, in addition, a long duration exposure time scale associated with said knob to provide means for setting long duration exposure times.

10. A photographic shutter comprising: shutter blades; a driving mechanism connected to said blades to operate them between an open position and a closed position; a short duration exposure escapement mechanism connected to said driving mechanism to control the same; and a long duration exposure escapement mechanism comprising a spring drive, means for manually cocking said spring drive to a predetermined long duration exposure time, gear members in said long duration exposure escapement mechanism, a friction coupling connecting said spring drive to said gear members, a first locking device connected to said driving mechanism to be controlled thereby and connected to said spring drive to retain said spring drive in cocked position and to release said spring drive for operation immediately after said driving mechanism has been released, an additional locking device connected to block said driving mechanism in its position corresponding to the open position of said shutter blades, and an actuating device to release said additional locking device at the end of the operation of said long duration exposure escapement mechanism.

11. A photographic shutter comprising: shutter blades; a driving mechanism connected to said blades to operate them between an open position and a closed position; a main driving member; a short duration exposure escapement mechanism connected to said driving mechanism to control the same; a lever articulately mounted on said main driving member and cooperating with said short duration exposure escapement mechanism; and a long duration exposure escapement mechanism comprising a spring drive and means for manually cocking said spring drive to a predetermined long duration exposure time, a first locking device connected to said driving mechanism to be controlled thereby and connected to said spring drive to retain said spring drive in cocked position and to release said spring drive for operation immediately after said driving mechanism has been released, an additional locking device connected to block said driving mechanism in its position corresponding to the open position of said shutter blades, and an actuating device to release said additional locking device at the end of the operation of said long duration exposure escapement mechanism.

References Cited by the Examiner
UNITED STATES PATENTS

| | | | |
|---|---|---|---|
| 1,053,152 | 2/1913 | Bruns | 95—63 |
| 1,696,264 | 12/1928 | Brueck | 95—63 |
| 1,751,808 | 3/1930 | Gauthier | 95—63 |
| 2,165,574 | 7/1939 | Pirwitz | 95—63 |
| 2,663,235 | 12/1953 | Fuerst | 95—63 |
| 2,961,935 | 11/1960 | Rentschler | 95—63 |
| 3,083,629 | 4/1963 | Kiper | 95—63 |

JOHN M. HORAN, *Primary Examiner.*